United States Patent

Mathes et al.

[11] Patent Number: 5,117,703
[45] Date of Patent: Jun. 2, 1992

[54] GEARWHEEL FOR THE DRIVE OF OFFSET PRESS CYLINDERS

[75] Inventors: Josef Mathes, Offenbach am Main; Roland Höll, Weiterstadt; Herbert Rebel, Rodgau, all of Fed. Rep. of Germany

[73] Assignee: MAN Roland Druckmaschinen AG, Fed. Rep. of Germany

[21] Appl. No.: 734,538

[22] Filed: Jul. 23, 1991

[30] Foreign Application Priority Data

Jul. 24, 1990 [DE] Fed. Rep. of Germany ....... 4023479

[51] Int. Cl.⁵ ............................................. F16H 55/18
[52] U.S. Cl. ....................................... 74/409; 74/392; 74/397
[58] Field of Search ................... 74/392, 397, 409, 440

[56] References Cited

U.S. PATENT DOCUMENTS

| 4,036,074 | 7/1977 | Bodnar | 74/409 |
| 4,331,040 | 5/1982 | Swasey | 74/440 X |
| 4,805,475 | 2/1989 | Hannel | 74/409 X |

FOREIGN PATENT DOCUMENTS

| 1650784 | 12/1972 | Fed. Rep. of Germany . |
| 2829026 | 10/1981 | Fed. Rep. of Germany . |
| 956906 | 4/1964 | United Kingdom ................. 74/409 |

Primary Examiner—Allan D. Herrmann
Assistant Examiner—David W. Laub
Attorney, Agent, or Firm—Leydig, Voit & Mayer

[57] ABSTRACT

A radially adjustable gearwheel for driving a cylinder of an offset press. The gear rim has three axially disposed tapered bores into which axially tapered bolts can be pressed to act radially on the gear rim. Additional axial bores are provided between the tapered bores to form expansion webs in the gear rim. The tapered bolts, in conjunction with the expansion webs, subject the gear rim to varying radial deformation in a gently rising parabolic curve depending on the tension applied to the tapered bolts so that the deformed gearwheel rolls with minimal impact and shock forces.

3 Claims, 1 Drawing Sheet

GEARWHEEL FOR THE DRIVE OF OFFSET PRESS CYLINDERS

FIELD OF THE INVENTION

The present invention relates generally to gearwheels for the drive of offset press cylinders and more particularly concerns a device for reducing backlash and out-of-true running of the gearwheels.

BACKGROUND OF THE INVENTION

Offset printing presses require very close synchronization of their gear trains in order to obtain satisfactory prints. A small amount of backlash or out-of-true running is enough to affect the quality of the prints. To synchronize the gearwheels, it is known in the prior art that means can be provided for radially deforming a gear rim so that it properly meshes with the adjacent gearwheel.

For example, DE-PS 1 650 784 discloses two variants of tensioning means for subjecting the gear rim of the drive gear of an offset press cylinder to radial deformation. In one of these variants, the gearwheel can be subjected to radial deformation from the force of an axially adjustable wedge disposed in an axial bore in the rim of the gearwheel. Alternatively, a radially disposed adjustable screw can be located in an axial bore. However, even if the bores are made relatively large, the tensioning devices lift only a few teeth of the gearwheel. As a result, therefore, these tensioning means produce undesirable gear impacts because there is only local deformation at one circumferential location of the gear rim.

In another prior art arrangement, DE-PS 2 829 026 discloses a gear drive in which the helical spur gearwheels have a coaxial tensioning disk. As disclosed in this reference, each tensioning disk has two or more tensioning devices which act axially on the rim of the gearwheel and the elastic axial deformation of the helical gear rim is used to adjust the backlash. Here, however, the gear teeth are tilted somewhat during the axial deformation produced by the tensioning disk.

OBJECTS AND SUMMARY OF THE INVENTION

It is the primary object of the invention to provide means for adjusting the backlash and smoothly correcting the out-of-true running of the drive gear of offset press cylinders.

A more detailed object of the invention is to provide tensioning means for deforming the gear rim of a gearwheel whereby partial enlargement of the diameter of the pitch circle of the gearwheel is possible in a relatively simple matter, the pitch circle enlargement extending with a gently rising parabolic curve so that the deformed gearwheel rolls with minimal impact.

To enable the gear rim of a gearwheel to be subjected to radial deformation, tapered bolts are inserted into the rim in an axial direction near the location where radial expansion of the gear rim is desired. Additional axial holes in the gear rim near the tapered bolts form expansion webs. Tightening of the tapered bolts causes local radial expansion of the gear rim surface which, in conjunction with the expansion webs, results in a gently rising parabolic shape.

DETAILED DESCRIPTION OF THE PREFERRED EMBODIMENT

Figures 1, 2:
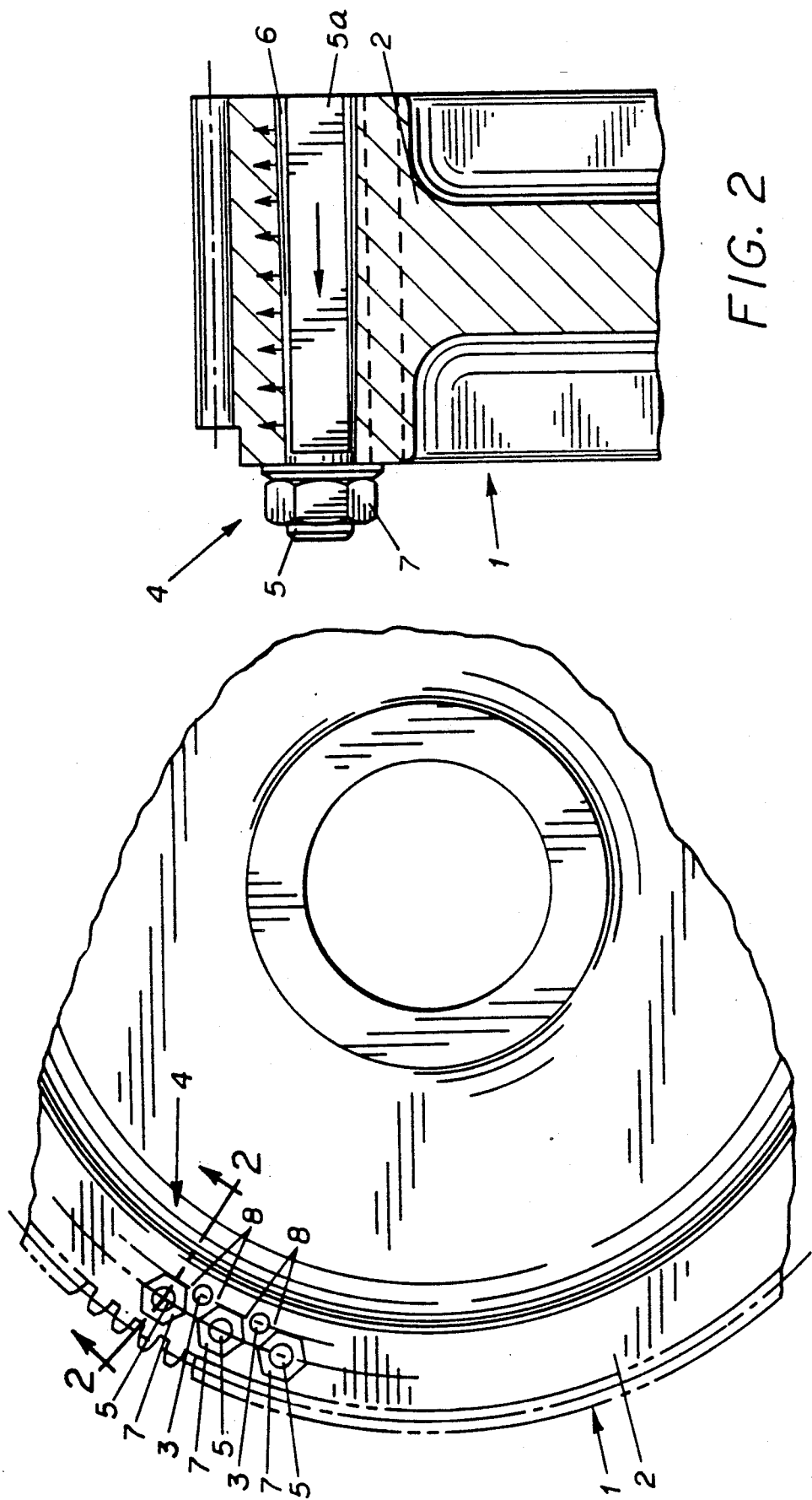
FIG. 1 is a partial and generally schematic plan view of a gearwheel according to the invention.
FIG. 2 is an enlarged and more detailed radial section through the gear rim of the gearwheel taken along line 2—2 in FIG. 1.

Turning now to the drawings, there is shown in FIGS. 1 and 2 a gearwheel 1 with a gear rim 2 having a tensioning device according to the present invention indicated generally at 4. Pursuant to the invention, the tensioning device 4 is in the form of three axially disposed tapered bores 6 provided with axially stressable tapered bolts 5 which, when tightened, act radially on the gear rim 2.

In further accordance with the invention, two additional bores 3 are provided which pass axially through the gear rim between the three tapered bores 6, so that deformable expansion webs 8 are left in the gear rim 2 in this area. In conjunction with the expansion webs, the axially stressable tapered bolts 5 subject the gear rim 2 to radial deformation on the order of thousandths to a few hundredths of a millimeter, depending on the torque with which the tapered bolts are tightened. The deformation extends radially to form a pitch circle which in this area has a gently rising parabolic shape. Radial adjustments to the rim are made until satisfactory register is obtained with the prints produced by the offset press. If larger areas or the entire gear rim periphery are to be subjected to deformation, then an appropriate number of additional tapered bolts 5 and additional bores 3 must be provided.

As shown in more detail in FIG. 2, each of the tapered bolts 5 has a threaded end which extends laterally out of the gear rim 2 and on which a nut 7 is screwed. In the stressed or tensioned state, the nut 7 bears against the gear rim 2 laterally either directly or via washers, lock-rings or the like. In the preferred embodiment and pursuant to another aspect of the invention, one or more sides of the shaft of each tapered bolt 5 are flattened, as indicated at 5a. In this way the force applied in the tapered bores 6 can be varied, depending on the position of the remaining conical segments of the tapered bolts 5, so that the deformation directions applied to the gear rim 2 can be varied.

From the foregoing it will be understood that the tapered bolts 5, of which there are preferably three, rotate with the gearwheel 1 and, depending on the torque of the bolts in conjunction with the expansion webs 8, subject the gear rim 2 to radial deformation. This controlled radial deformation ranges from several thousandths to a few hundredths of a millimeter and varies as to magnitude and, if desired, direction. As a result, an enlarged pitch circle diameter, which remains substantially round due to the gently rising parabolic shape, is produced by the local deformation, and thus the gearwheel operates with minimal impact and shock forces.

We claim as our invention:

1. A radially adjustable gearwheel for driving a cylinder of an offset press comprising, a gear rim, at least three tapered bores axially disposed in the gear rim and each adapted to receive an axially stressable tapered bolt, and a plurality of additional bores axially disposed in the gear rim, each of the additional bores being disposed between a pair of the tapered bores to form expansion webs in the gear rim so that the tapered bolts in conjunction with the expansion webs subject the gear rim to radial deformation having a gently rising parabolic shape.

2. A gearwheel according to claim 1, further comprising a plurality of tapered bolts inserted into said tapered bores and tightened to produce a peripheral radial force on the gear rim.

3. A gearwheel according to claim 2, wherein the tapered bolts are flattened longitudinally along at least one side thereof, so that the direction of expanding radial deformation caused by the tapered bolts in conjunction with the expansion webs can be selectively varied.

* * * * *